US012719761B2

(12) United States Patent
McDaniel et al.

(10) Patent No.: US 12,719,761 B2
(45) Date of Patent: Aug. 25, 2026

(54) SYSTEMS AND METHODS FOR COMMUNICATION MODIFICATION TO REDUCE INACCURATE MACHINE-LEARNING-BASED COMMUNICATION SUPPRESSIONS

(71) Applicant: Capital One Services, LLC, McLean, VA (US)

(72) Inventors: Christopher McDaniel, Glen Allen, VA (US); Matthew Louis Nowak, Midlothian, VA (US); Michael Anthony Young, Jr., Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 1060 days.

(21) Appl. No.: 17/816,621

(22) Filed: Aug. 1, 2022

(65) Prior Publication Data

US 2024/0039798 A1 Feb. 1, 2024

(51) Int. Cl.
*H04L 41/16* (2022.01)

(52) U.S. Cl.
CPC .................................... *H04L 41/16* (2013.01)

(58) Field of Classification Search
CPC .. G06F 11/3438; G06N 3/08; G06Q 30/0242; G06Q 30/0271; G06Q 30/0276; H04L 12/1895; H04W 4/12
See application file for complete search history.

(56) References Cited

U.S. PATENT DOCUMENTS

2021/0021553 A1* 1/2021 Benkovich .......... G06F 21/6209
2023/0099888 A1* 3/2023 Jaini .................. G06Q 30/0271 455/466

* cited by examiner

*Primary Examiner* — Olugbenga O Idowu
(74) *Attorney, Agent, or Firm* — Foley & Lardner LLP

(57) ABSTRACT

Methods and systems are described herein for generating communication modifications to reduce inaccurate machine-learning-based communication suppressions. The system may receive a candidate communication to be sent to a user device or user account. The system may generate a prediction indicating whether a negative action is likely to be taken by a machine learning model with respect to the candidate communication. Based on a prediction that a negative action is likely to be taken by a machine learning model with respect to the candidate communication, the system may modify the candidate communication.

20 Claims, 7 Drawing Sheets

200

203 206 209

| *Communication Metadata* | *Communication Text* | *Suppression* |
|---|---|---|
| *<comm_data_1>* | *<tokenized_data_1>* | *Yes* |
| *<comm_data_2>* | *<tokenized_data_2>* | *No* |
| *<comm_data_3>* | *<tokenized_data_3>* | *Yes* |
| *<comm_data_4>* | *<tokenized_data_4>* | *Yes* |
| *<comm_data_5>* | *<tokenized_data_5>* | *No* |

| *Candidate Instance Metadata* | *Candidate Instance Text* |
|---|---|
| *<inst_data_1>* | *<inst_tokenized_data_1>* |
| *<inst_data_2>* | *<inst_tokenized_data_2>* |
| *<inst_data_3>* | *<inst_tokenized_data_3>* |

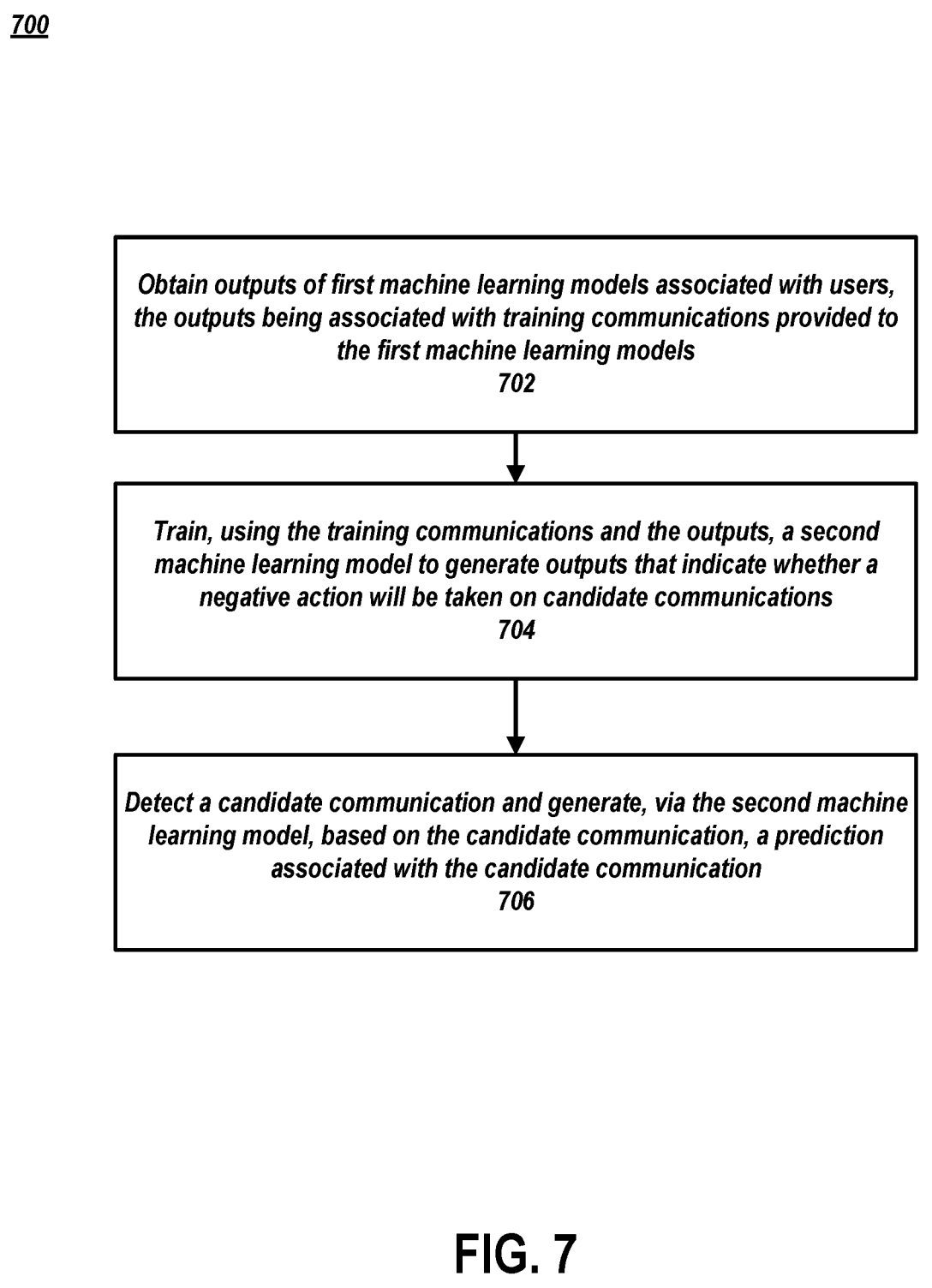

Obtain outputs of first machine learning models associated with users, the outputs being associated with training communications provided to the first machine learning models
702

Train, using the training communications and the outputs, a second machine learning model to generate outputs that indicate whether a negative action will be taken on candidate communications
704

Detect a candidate communication and generate, via the second machine learning model, based on the candidate communication, a prediction associated with the candidate communication
706

FIG. 7

SYSTEMS AND METHODS FOR COMMUNICATION MODIFICATION TO REDUCE INACCURATE MACHINE-LEARNING-BASED COMMUNICATION SUPPRESSIONS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution in communication suppression. For example, machine learning predictions to suppress communications may be inaccurate, resulting in a loss of important communications. Moreover, machine learning predictions to not suppress communications may also be inaccurate, allowing malicious or other unwanted communications to target accounts. Thus, systems and methods are needed for reducing inaccurate machine-learning-based communication suppressions.

SUMMARY

Methods and systems are described herein for novel uses and/or improvements to artificial intelligence applications. As one example, methods and systems are described herein for communication modification to reduce inaccurate machine-learning-based communication suppressions.

Conventional systems inaccurately suppress communications, resulting in a loss of valuable information or vulnerability to malicious communications. However, the difficulty in adapting artificial intelligence models for this practical benefit faces technical challenges causing the results in current machine learning model architectures to lack accuracy and precision. For example, conventional systems determine suppression based on insufficient criteria and thus often fail to suppress communications correctly.

To overcome these technical deficiencies in adapting artificial intelligence models for this practical benefit, methods and systems disclosed herein train a communication processing machine learning model to predict whether a candidate communication will be suppressed by a user machine learning model. When the communication processing machine learning model predicts that the communication will be suppressed, the system may modify the candidate communication to decrease the likelihood of suppression. For example, the system may generate different instances of the candidate communication and input the different instances into the communication processing machine learning model. The communication processing machine learning model may predict whether each instance will be suppressed, and the system may update the candidate communication to reflect a given instance that is predicted to not be suppressed. Accordingly, the methods and systems provide a more accurate communication suppression system, resulting in a decrease in lost communications and a decrease in vulnerability to malicious or other unwanted communications.

In some aspects, the system may obtain suppression-related output labels output by a user machine learning model. The suppression-related output labels may be associated with training communications. They may indicate whether a respective training communication provided to the user machine learning model will be suppressed by the user machine learning model. In some embodiments, the user machine learning model may be trained to facilitate suppression of malicious or undesired communications. The system may train a communication processing machine learning model to generate outputs that indicate whether a given candidate communication will be suppressed by the user machine learning model. The system may use the training communications and the suppression-related output labels for training the communication processing machine learning model.

In response to detecting a candidate communication, the system may input the candidate communication into the communication processing machine learning model. The system may obtain a prediction associated with the candidate communication that indicates whether the candidate communication will be suppressed by the user machine learning model. If the candidate communication predicting that the candidate communication will be suppressed, the system may modify the candidate communication. The modification may include generating different instances of the candidate communication, inputting the different instances into the communication processing machine learning model to generate predictions associated with the plurality of different instances, and updating the candidate communication to reflect a given instance that the candidate communication predicts will not be suppressed by the user machine learning model.

In some aspects, the system may incorporate one or more terms in the given instance into the candidate communication. In some instances, the system may remove one or more terms from the candidate communication based on the given instance. In some instances, the system may incorporate metadata associated with the given instance into the candidate communication.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure for input into a machine learning model, in accordance with one or more embodiments.

FIG. 4 illustrates a table that may store training data for training a machine learning model, in accordance with one or more embodiments.

FIG. 7 shows a flowchart of the process for generating a communication modification to reduce inaccurate machine-learning-based communication suppressions, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
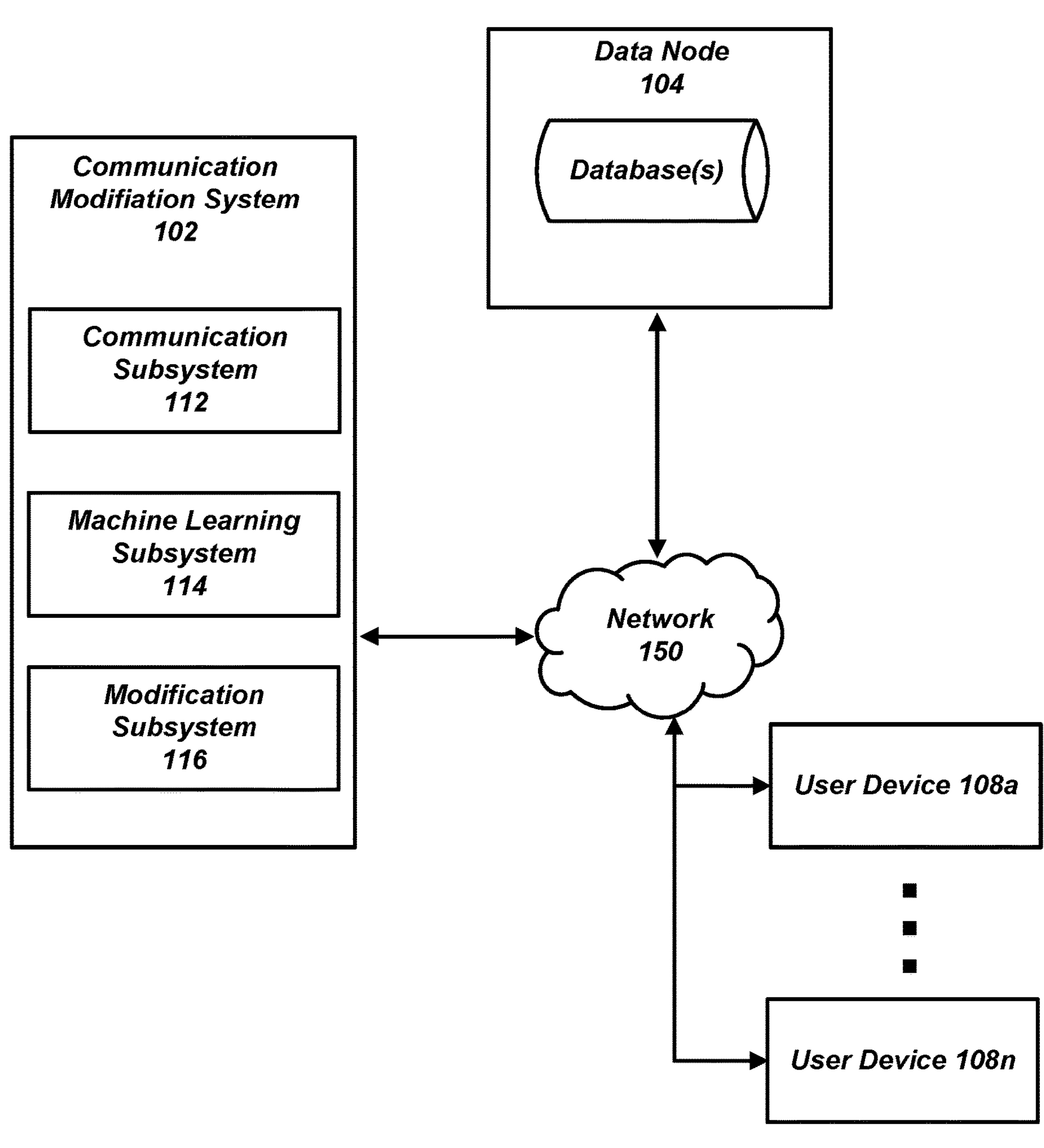
FIG. 1 shows an illustrative system for generating a communication modification to reduce inaccurate machine-learning-based communication suppressions, in accordance with one or more embodiments.

FIG. 1 shows an illustrative system 100 for generating a communication modification to reduce inaccurate machine-learning-based communication suppressions, in accordance with one or more embodiments. System 100 includes communication modification system 102, data node 104, and user devices 108*a*-108*n*. In some embodiments, only one user device may be used while in other embodiments multiple user devices may be used. The user devices 108*a*-108*n* may be associated with one or more users. The user devices 108*a*-108*n* may be associated with one or more user accounts. In some embodiments, user devices 108*a*-108*n* may be a computing device that may receive and send data via network 150. User devices 108*a*-108*n* may be end-user computing devices (e.g., desktop computers, laptops, electronic tablets, smart phones, and/or other computing devices used by end users). User devices 108*a*-108*n* may output (e.g., via a graphical user interface) communications, recommendations, or other data received from, for example, communication sub system 112.

Communication modification system 102 may execute instructions for modifying communications to reduce inaccurate machine-learning-based communication suppressions. Communication modification system 102 may include software, hardware, or a combination of the two. For example, communication modification system 102 may be a physical server or a virtual server that is running on a physical computer system. In some embodiments, communication modification system 102 may be configured on a user device (e.g., a laptop computer, a smart phone, a desktop computer, an electronic tablet, or another suitable user device).

Data node 104 may store various data, including one or more machine learning models (e.g., user machine learning models), training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, communication modification system 102 and data node 104 may reside on the same hardware and/or the same virtual server/computing device. Network 150 may be a local area network, a wide area network (e.g., the Internet), or a combination of the two.

Communication modification system 102 may obtain training communications and suppression-related output labels associated with the training communications. For example, the training communications may include electronic messages that have been received by one or more users in the past. The electronic messages may include electronic mail, text messages, instant messages, WhatsApp messages, LinkedIn messages, or another form of communications. Each user associated with the training communications may additionally be associated with one or more machine learning models (e.g., user machine learning models). User machine learning models may be machine learning models that are trained to take one or more actions with respect to communications. For example, the user machine learning models may be trained to suppress communications that are, for example, malicious or otherwise unwanted. In some embodiments, the user machine learning models may be trained on user behavior to predict whether users will take one or more actions with respect to communications.

The user machine learning model or models for each user may output suppression-related output labels based on the training communications. The suppression-related output labels may indicate whether or not the user machine learning model suppresses the training communication. In some embodiments, each output label may indicate whether any negative action is taken on a respective training communication by the user machine learning model. For example, the negative action may include dismissal, suppression, deletion, blocking, marking as spam, or another negative action related to a communication. In some embodiments, each output label may indicate whether a positive action is taken with respect to a training communication by a user machine learning model. For example, the positive action may include retaining, saving, forwarding, replying, clicking on, or another positive action related to a communication. The output labels may include "yes," "no," "suppressed," "not suppressed," "blocked," "not blocked," "forwarded," "not forwarded," or any other output labels. In some embodiments, each output label may indicate whether another type of action is taken on a respective training communication by a user machine learning model.

For example, a user may receive a plurality of communications (e.g., emails) via a user account (e.g., email account) on a user device (e.g., user devices 108*a*-108*n*). The user may be associated with a user machine learning model that predicts whether incoming communications are malicious or unwanted by the user. In response to identifying malicious or unwanted communications, the user machine learning model associated with the user may output suppression-related output labels such as "suppress" or "yes." In response, the system may suppress (e.g., dismiss, delete, block, mark as spam, etc.) the communication, removing the need of the user himself to interfere to suppress the communication. The training communications and respective suppression-related output labels may be used as training data to train a machine learning model.

FIG. 2 illustrates a table 200 that may store training data for training a machine learning model, in accordance with one or more embodiments. Table 200 may represent data generated by one or more user machine learning models. In some embodiments, the data stored in table 200 may be used to train another machine learning model. Field 203 may include communication metadata for each training communication. The communication metadata may include subjects, text, font, font size, images, multimedia components, hyperlinks, alt text, to addresses, from addresses, dates, times, or other metadata. Field 206 may include text corresponding to the metadata in field 203. For example, the text may include subject text, message text, to addresses, from addresses, and other text associated with the training communication. Field 209 may indicate whether each training communication was suppressed by a user machine learning model. The training routine may train a machine learning model, using (1) the communication metadata, (2) the corresponding communication text, and (3) the suppression output In some embodiments, table 200 may be stored on data node 104.

Returning to FIG. 1, communication modification system 102 may receive the training data (e.g., output labels and training communications) using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the training data from data node 104 or from another computing device. In some embodiments communication subsystem 112 may receive the training data from one or more user devices 108*a*-108*n*. Each user device may include a computing device enabling transmission of the data. However, in some embodiments, the user devices may connect wirelessly to communication modification system 102. Communication subsystem 112 may pass the training data, or a pointer to the training data in memory, to machine learning subsystem 114. For example, communication subsystem 112 may pass communications (e.g., emails) received by a user, as well as the suppression-related output labels for each communication, to machine learning subsystem 114. In some embodiments, communication subsystem 112 may pass communications and corresponding suppression-related output labels for multiple users to machine learning subsystem 114. In some embodiments, communication modification system 102 may further receive candidate communications using communication subsystem 112. For example, candidate communications may be draft communications, new communications, communications that have not yet been sent to user devices 108*a*-108*n*, or any other communications.

Machine learning subsystem 114 may include software components, hardware components, or a combination of both. For example, machine learning subsystem 114 may include software components (e.g., API calls) that access one or more machine learning models. Machine learning subsystem 114 may access training data, for example, in memory. In some embodiments, machine learning subsystem 114 may access the training data on data node 104 or on user devices 108*a*-108*n*. In some embodiments, the training data may include the training communications and corresponding suppression-related output labels for a user or multiple users. In some embodiments, machine learning subsystem 114 may access one or more user machine learning models. For example, machine learning subsystem 114 may access the user machine learning models on data node 104 or on user devices 108*a*-108*n*. In some embodiments, the user machine learning models may be trained to facilitate suppression of malicious or undesired communications. For example, the user machine learning models may be trained to facilitate suppression of malicious or undesired communications associated with one or more of user devices 108*a*-108*n*. The user machine learning models may be trained to facilitate suppression of malicious or undesired communications received by accounts associated with one or more of user devices 108*a*-108*n*. In some embodiments, malicious communications may be communications that endanger a user, a user device, or an account associated with a user. For example, a malicious communication may include scams, computer viruses, misleading information, upsetting language or images, or other malicious information. In some embodiments, unwanted communications may be communications that a user does not desire to receive. For example, unwanted communications may include high frequency communications, spam mail, advertisements, or other communications that user does not desire to receive.

In some embodiments, machine learning subsystem 114 may access training data generated by one or more user machine learning models and may use the training data to train other machine learning models. For example, the communication processing machine learning model may be trained using training communications and corresponding output labels generated by user machine learning models (e.g., as shown in FIG. 2). Machine learning subsystem 114 may train a new machine learning model, such as a communication processing machine learning model, to generate outputs that indicate whether a given candidate communication will be suppressed by a user machine learning model (e.g., associated with a user device 108*a*-108*n* or an account relating to a user device 108*a*-108*n*). In some embodiments, a communication processing machine learning model may be a machine learning model that is trained to predict whether user machine learning models (e.g., associated with a user or multiple users) will suppress communications. In some embodiments, the communication processing machine learning model may be specific to a particular user (e.g., trained using training communications generated by a user machine learning model specific to that user). In some embodiments, the communication processing machine learning model may relate to multiple users (e.g., trained using training communications generated by user machine learning models specific to different users).

In some embodiments, machine learning subsystem 114 may train the communication processing machine learning model. Machine learning subsystem 114 may receive a dataset that includes a plurality of training communications. For example, the dataset may include training communications associated with a particular user or an account relating to a user (e.g., an email account). The dataset may include training communications associated with multiple users or accounts relating to multiple users. The dataset may additionally include suppression-related output labels indicating whether each training communication was suppressed by a user machine learning model associated with the user or user account. The communication processing machine learning model may thus be trained to output a likelihood, such as a percentage or probability, that a given candidate communication will be suppressed by a user machine learning model.

Figure 3:
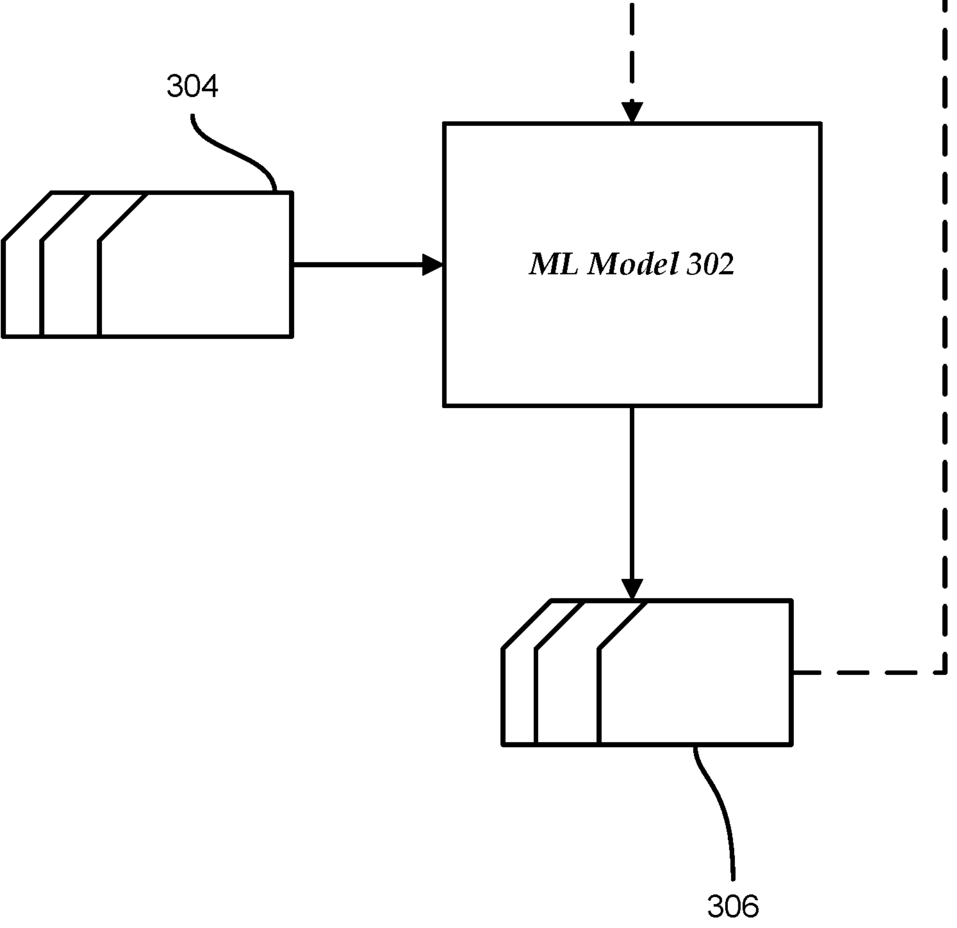
FIG. 3 illustrates an exemplary machine learning model, in accordance with one or more embodiments.

FIG. 3 illustrates an exemplary machine learning model 302, in accordance with one or more embodiments. The machine learning model may have been trained using training communications and suppression-related output labels generated by user machine learning models to predict whether user machine learning models will suppress various candidate communications. In some embodiments, machine learning model 302 may be included in machine learning subsystem 114 or may be associated with machine learning subsystem 114. In some embodiments, machine learning model 302 may represent a user machine learning model, a communication processing machine learning model, or another machine learning model. Machine learning model 302 may take input 304 (e.g., communication metadata, as described in greater detail with respect to FIG. 4) and may generate outputs 306 (e.g., suppression-related predictions, as described in greater detail with respect to FIG. 5). The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function, which combines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

The machine learning model may be structured as a factorization machine model. The machine learning model may be a non-linear model and/or a supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Returning to FIG. 1, modification subsystem 116 may modify candidate communications based on outputs from one or more machine learning models. In some embodiments, modification subsystem 116 may modify communications received from communication subsystem 112. In some embodiments, modification subsystem 116 may receive outputs of a machine learning model (e.g., communication processing machine learning model, as shown in FIG. 3) via machine learning subsystem 114. Furthermore, modification subsystem 116 may modify candidate communications based on outputs of user machine learning models. For example, modification subsystem 116 may modify a candidate communication in response to a prediction, from a communication processing machine learning model, such that the candidate communication will be suppressed by a user machine learning model. For example, the candidate communication may be a draft email to be sent to a user's account. The output from the communication processing may indicate that the user machine learning model associated with the user will suppress the email. Modification subsystem 116 may, in response, modify the candidate communication. Modification subsystem 116 may include software components, hardware components, or a combination of both.

In some embodiments, modification subsystem 116 may generate different instances of the candidate communication. The different instances may be variations of the candidate communication. For example, the different instances may have different subjects, text, font, font size, color, images, multimedia components, hyperlinks, alt text, metadata, to addresses, from addresses, dates, times, or other components. Modification subsystem 116 may generate the different instances such that each variation is represented in at least one instance. In some embodiments, one or more of the different instances may be a new candidate communication. For example, modification subsystem 116 may generate different instances, or versions, of the draft email to be sent to the user. The different instances may have varying contents (e.g., subjects text, images, multimedia components, hyperlinks, alt text, metadata, to addresses, from addresses, dates, times, or other components). In some embodiments, modification subsystem 116 may alter font, font size, color, or other aspects of components of the candidate communication. Modification subsystem 116 may input the different instances into a machine learning model (e.g., a communication processing machine learning model, as shown in FIG. 3) via machine learning sub system 114.

FIG. 4 illustrates a data structure 400 for input into a machine learning model, in accordance with one or more embodiments. The data stored in data structure 400 may be input into the trained communication processing model during execution of the model. Data structure 400 may include field 403 that stores candidate instance metadata for various instances of a candidate communication. For example, each entry of the candidate instance metadata may correspond to a different instance of a candidate communication. The metadata may be stored in a digital file containing a digital representation of the data (e.g., in data node 104). The metadata may describe subjects, text, font, font size, images, multimedia components, hyperlinks, alt text, to addresses, from addresses, dates, times, or other metadata associated with the candidate communication. Field 406 may store candidate instance text corresponding to the candidate instance metadata. The candidate instance text may be retrieved from memory and/or from metadata received with the candidate communications. The candidate instance text may include subject text, message text, to addresses, from addresses, or other text associated with the candidate communication. For example, field 403 may include metadata for various instances of a draft email to be sent to a user, and field 406 may include text or text portions of the draft email.

In some embodiments, when candidate communications or instances of candidate communications are received (e.g., via communication sub system 112), communication modification system 102 may generate or populate data structure 400. Communication modification system 102 may sort the metadata for each candidate communication or instance of a candidate communication into field 403. Communication modification system 102 may sort the text for each candidate communication or instance of a candidate communication into field 406.

When the candidate communication data is received, communication modification system 102 may use a machine learning model (e.g., a communication processing machine learning model via machine learning subsystem 114) to generate predictions indicating whether the candidate communications or instances will be suppressed by user machine learning models. Thus, machine learning subsystem 114 may input, into the communication processing machine learning model, the candidate instance metadata (e.g., subjects, text, font, font size, images, multimedia components, alt text, hyperlinks, alt text, to addresses, from addresses, dates, times, or other metadata) and corresponding candidate instance text (e.g., subject text, message text, to addresses, from addresses, and other text associated with the candidate communication) for each candidate communication instance. Machine learning subsystem 114 may perform the inputs sequentially or simultaneously (e.g., using multiple instances of the machine learning model).

Machine learning subsystem 114 may receive, from the communication processing machine learning model, a plurality of indications, indicating whether each candidate instance will be suppressed by a machine learning model. That is, the machine learning model may output a Boolean value, a probability, a percentage, or another indication of likelihood of suppression. In some embodiments, the machine learning model may additionally output a confidence rating associated with the output value. In some embodiments, the communication processing machine learning model may output predictions in any other format.

Figure 5:
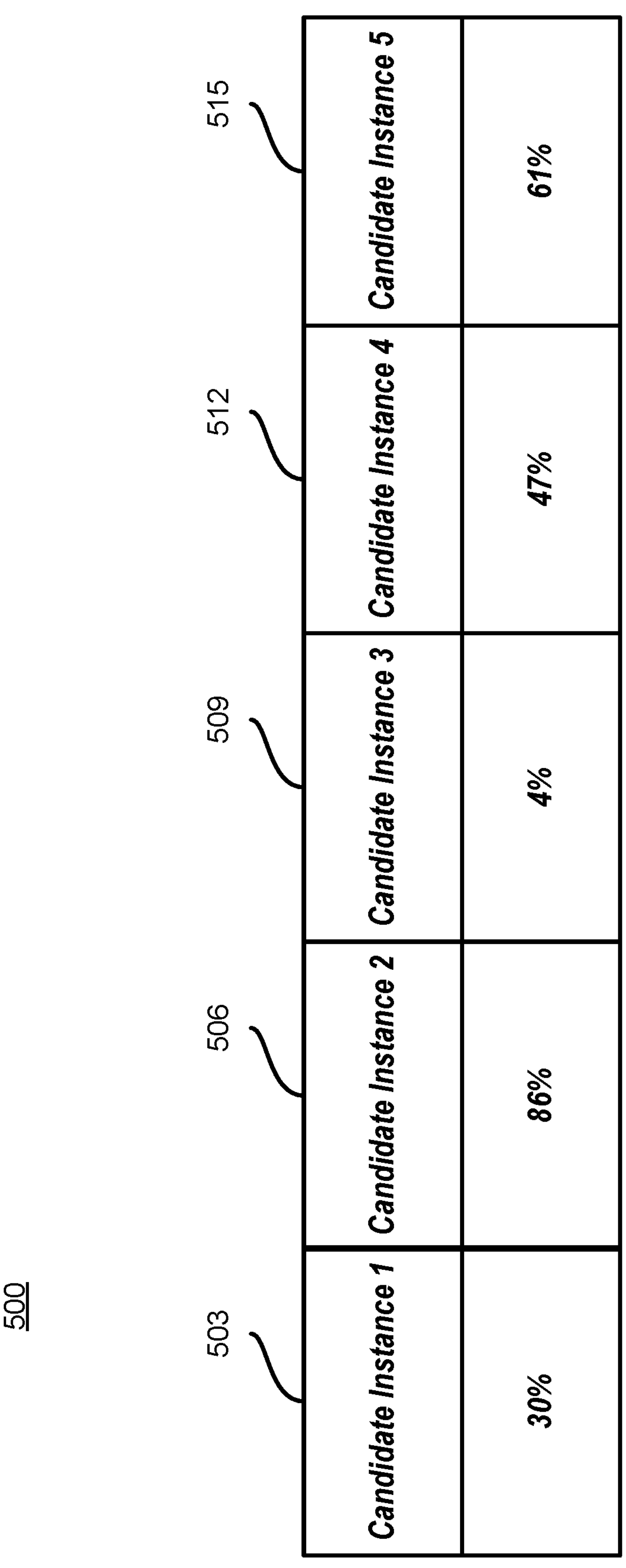
FIG. 5 illustrates a data structure representing communication predictions, in accordance with one or more embodiments.

FIG. 5 illustrates a data structure 500 representing communication predictions, in accordance with one or more embodiments. Fields 503-515 may store predictions associated with different instances of a candidate communication. Additional fields may be included in data structure 500 (e.g., for additional instances of the candidate communication) while some fields may be removed from the data structure. In some embodiments, the predictions may indicate a likelihood of suppression of each instance, a likelihood that each instance is not suppressed, or some other indication. In some embodiments, the predictions may be output as probabilities, percentages, or other indications of likelihood. For example, data structure may include a prediction relating to each version of a draft email to be sent to the user.

In some embodiments, communication modification system 102 may update (e.g., via modification subsystem 116) a candidate communication based on the outputs generated by the communication processing machine learning model (e.g., received via machine learning subsystem 114). Communication modification system 102 may update the candidate communication to reflect a given instance indicated by data structure 500 as being unlikely to be suppressed. For example, data structure 500 may display a likelihood of suppression. In this case, communication modification system 102 may identify candidate instance 3 (e.g., as shown in field 509) as being the least likely instance to be suppressed. In another example, data structure 500 may display likelihood of instances not being suppressed. In this case, communication modification system 102 may identify candidate instance 2 (e.g., as shown in field 506) as being the least likely instance to be suppressed.

In some embodiments, communication modification system 102 may identify the instance least likely to be suppressed and may update the candidate communication to reflect the given instance (e.g., using modification subsystem 116). Communication modification system 102 may identify multiple instances that are least likely to be suppressed and may update the candidate communication to reflect the multiple given instances. For example, communication modification system 102 may identify one or more versions of a draft email that are the least likely to be suppressed by a user machine learning model associated with a user.

For example, communication modification system 102 may identify candidate instance 3 (e.g., field 509) and candidate instance 1 (e.g., field 503) as having the lowest probabilities of suppression (e.g., 4% and 30%, respectively). In some embodiments, communication modification system 102 may identify candidate instances above or below a particular threshold. For example, if data structure 500 represents likelihoods of suppression, communication modification system 102 may identify any instance with a likelihood of suppression that falls below 50%. For example, communication modification system 102 may identify candidate instance 1 (e.g., field 503), candidate instance 3 (e.g., field 509), and candidate instance 4 (e.g., field 512). Communication modification system 102 may update the candidate communication (e.g., using modification subsystem 116) to reflect the aforementioned candidate instances falling below 50% likelihood of suppression while excluding candidate instance 2 (e.g., field 506) and candidate instance 5 (e.g., field 515), which have over a 50% likelihood of suppression.

In some embodiments, communication modification system 102 (e.g., modification subsystem 116) may update the candidate communication to reflect one or more portions of the identified candidate instances. For example, modification subsystem 116 may update a draft email to be sent to a user based on one or more versions of the draft email that are least likely to be suppressed. For example, as described above, communication modification system 102 identified candidate instances 1, 3, and 4 as having the lowest likelihood of suppression. Modification subsystem 116 may therefore update the candidate communication to reflect one or more portions of one or more of the identified candidate instances. In some embodiments, modification subsystem 116 may incorporate one or more portions of one or more of the identified candidate instances into the candidate communication or remove one or more portions of the candidate communication to reflect the candidate instances. For example, modification subsystem 116 may incorporate one or more terms in the given instance into the candidate communication or remove one or more terms from the candidate communication based on the given instance. In some embodiments, modification subsystem 116 may incorporate metadata associated with the given instance into the candidate communication or remove metadata from the candidate communication based on the given instance. In some embodiments, modification subsystem 116 may incorporate one or more images or multimedia items in the given instance into the candidate communication or remove one or more images or multimedia items from the candidate communication based on the given instance. In some embodiments, updating the candidate communication to reflect the given instance may include any other modifications to subjects, text, font, font size, images, multimedia components, hyperlinks, metadata, to addresses, from addresses, dates, times, or other components of the candidate communication based on the given instance. In some embodiments, updating the candidate communication to reflect the given instance may include replacing the candidate communication with the given instance. Modification subsystem 116 may send modified communications to communication subsystem 112, which may transmit the modified communications to one or more of user devices 108*a*-108*n*. For example, modification subsystem 116 may send the updated draft email to communication subsystem 112, which may transmit the updated email to an account (e.g., an email account) associated with the user.

In some embodiments, communication modification system 102 (e.g., modification subsystem 116) may generate a recommendation that includes one or more portions of one or more of the identified candidate instances. For example, the recommendation may include a given instance that is predicted (e.g., by the communication processing machine learning model) to not be suppressed or that is unlikely or the least likely to be suppressed. the recommendation may include multiple given instances that are predicted to not be suppressed or that are unlikely or the least likely to be suppressed. In some embodiments, the recommendation may include suggested modifications to the candidate communication. The suggested modifications may include any of the updates detailed above. For example, modification subsystem 116 may generate a recommendation that includes an updated draft email or versions of a draft email that are unlikely to be suppressed. Communication subsystem 112 may transmit the recommendation to one or more of user devices 108*a*-108*n*.

In some embodiments, in response to a prediction (e.g., from a communication processing machine learning model) that a candidate communication will not be suppressed by a user machine learning model, communication subsystem 112 may transmit the unmodified communication to one or more of user devices 108*a*-108*n*. Modification subsystem 116 may forego modification of candidate communications that are not predicted to be suppressed by a user machine learning model. For example, communication subsystem 112 may transmit an unmodified email draft to a user's email account if it is predicted not to be suppressed.

Computing Environment

Figure 6:
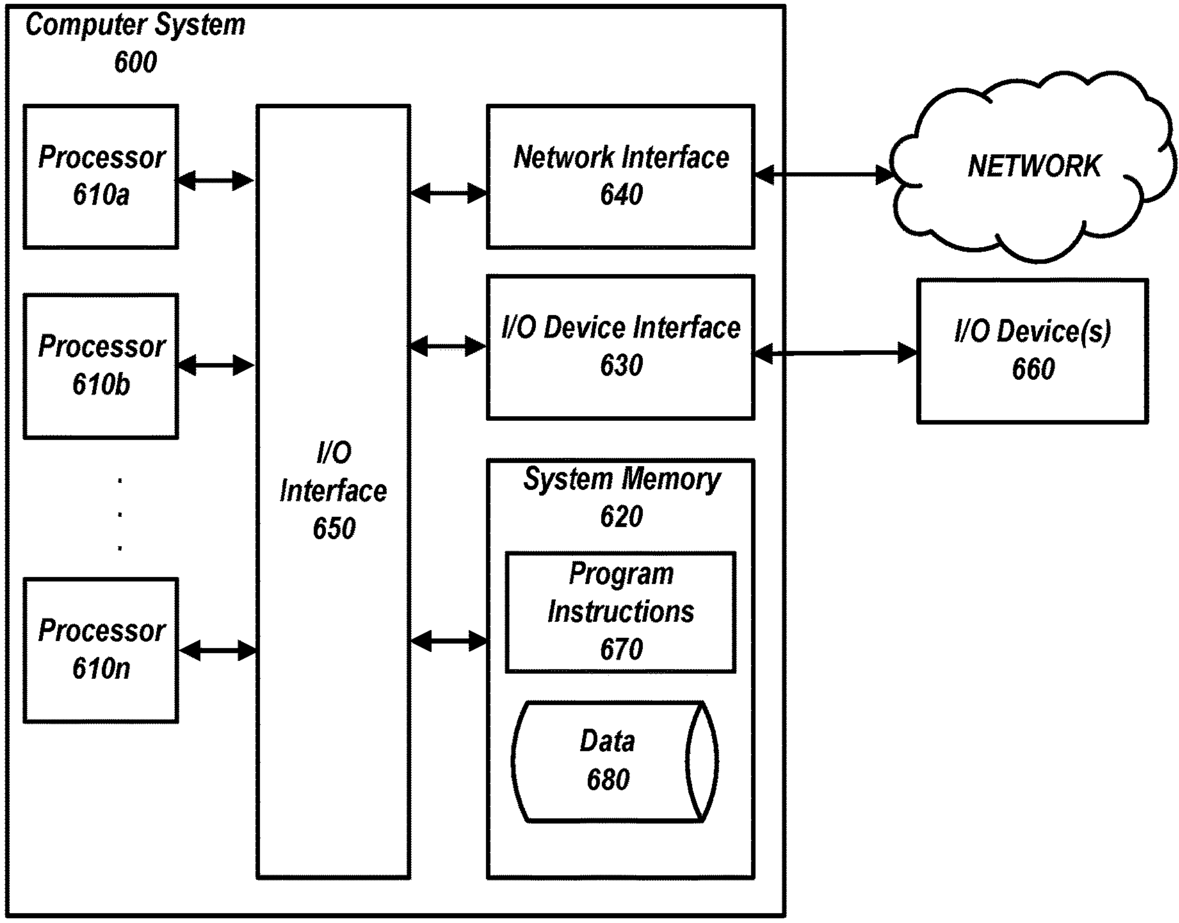
FIG. 6 illustrates a computing device, in accordance with one or more embodiments.

FIG. 6 shows an example computing system 600 that may be used in accordance with some embodiments of this disclosure. In some instances, computing system 600 is referred to as a computing system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computing system 600 through a wired or wireless connection. I/O devices 660 may be connected to computing system 600 from a remote location. I/O devices 660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

FIG. 7 shows a flowchart of the process 700 for generating a communication modification to reduce inaccurate machine-learning-based communication suppressions, in accordance with one or more embodiments. For example, the system may use process 700 (e.g., as implemented on one or more system components described above) in order to modify communications to reduce inaccurate machine-learning-based communication suppressions.

At step 702, process 700 (e.g., using one or more of processors 610*a*-610*n*) obtains outputs from first machine learning model. The first machine learning model may be associated with one or more of I/O devices 660. For example, the system may obtain outputs of first machine learning models (which may be stored on a network, on I/O devices 660, in data 680, or elsewhere) associated with users. The outputs may be associated with training communications provided to the first machine learning models. In some embodiments, the outputs may indicate a prediction, such as whether each training communication provided to the first machine learning models will be dismissed by the first machine learning models. By doing so, the system may obtain training data from the first machine learning models. The system may store the training data in data 680.

In some embodiments, the first machine learning models may be trained to facilitate dismissal of malicious or undesired communications. For example, the system may be trained to predict which communications are malicious or undesired based on content, metadata, frequency, sender, or other information. By doing so, the system may remove the need of the user to review each communication and assess its malicious or undesirable properties.

At step 704, process 700 (e.g., using one or more of processors 610*a*-610*n*) trains a second machine learning model (which may be stored on a network, in data 680, or elsewhere) using the training communications and the outputs obtained at step 702. For example, process 700 may train the second machine learning model to generate outputs that indicate whether a negative action will be taken on candidate communications. The system thus trains the second machine learning model to predict negative actions to be taken by the first machine learning models. For example, the negative action may comprise dismissal of the candidate communication.

At step 706, process 700 (e.g., using one or more of processors 610*a*-610*n*) detects a candidate communication. For example, process 700 may input the candidate communication into the second machine learning model. Process 700, generates, via the second machine learning model and based on the candidate communication, a prediction associated with the candidate communication. For example, the prediction may comprise an indication of whether the first machine learning models will dismiss the candidate communication.

In some embodiments, in response to the prediction associated with the candidate communication indicating that the negative action will be taken on the candidate communication, process 700 (e.g., using one or more of processors 610*a*-610*n*) may modify the candidate communication. For example, process 700 may generate different instances of the candidate communication. Process 700 may input the different instances into the second machine learning model to generate predictions associated with the plurality of different instances. Process 700 may then generate a recommendation comprising a given instance associated with a prediction indicating that the candidate communication will be retained by the one or more first machine learning models.

In some embodiments, in response to the prediction associated with the candidate communication indicating that the negative action will be taken on the candidate communication, process 700 (e.g., using one or more of processors 610*a*-610*n*) may modify the candidate communication by (i) generating a plurality of different instances of the candidate communication, (ii) inputting the plurality of different instances into the second machine learning model to generate predictions associated with the plurality of different instances, and (iii) updating the candidate communication to reflect a given instance associated with a prediction indicating that the candidate communication will be retained by the one or more first machine learning models. In some embodiments, updating the candidate communication to reflect the given instance may comprise incorporating one or more components of the given instance into the candidate communication. In some embodiments, updating the candidate communication to reflect the given instance may comprise removing one or more components from the candidate communication based on the given instance. In some embodiments, updating the candidate communication to reflect the given instance may comprise replacing the candidate communication with the given instance. In some embodiments, process 700 may output (e.g., using I/O device interface 630) the updated candidate communication to one or more of I/O devices 660.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising obtaining a plurality of outputs of one or more first machine learning models associated with one or more users, the plurality of outputs being associated with a plurality of training communications provided to the one or more first machine learning models, each output of the plurality of outputs indicating a prediction of at least one of the one or more first machine learning models with respect to an action to be taken on a respective training communication; training, using the plurality of training communications and the plurality of outputs, a second machine learning model to generate outputs that indicate whether a negative action will be taken on each candidate communication; and subsequent to the training of the second machine learning model, detecting a candidate communication and generating, via the second machine learning model, based on the candidate communication, a prediction associated with the candidate communication, the prediction indicating whether the negative action will be taken on the candidate communication in connection with one or more outputs of the one or more first machine learning models for the candidate communication.

2. The method of any one of the preceding embodiments, further comprising in response to the prediction associated with the candidate communication indicating that the negative action will be taken on the candidate communication, modifying the candidate communication by (i) generating a plurality of different instances of the candidate communication, (ii) inputting the plurality of different instances into the second machine learning model to generate predictions associated with the plurality of different instances, and (iii) generating a recommendation comprising a given instance associated with a prediction indicating that the candidate communication will be retained by the one or more first machine learning models.

3. The method of any one of the preceding embodiments, further comprising in response to the prediction associated with the candidate communication indicating that the negative action will be taken on the candidate communication, modifying the candidate communication by (i) generating a plurality of different instances of the candidate communication, (ii) inputting the plurality of different instances into the second machine learning model to generate predictions associated with the plurality of different instances, and (iii) updating the candidate communication to reflect a given instance associated with a prediction indicating that the candidate communication will be retained by the one or more first machine learning models.

4. The method of any one of the preceding embodiments, wherein updating the candidate communication to reflect the given instance comprises incorporating one or more components of the given instance into the candidate communication.

5. The method of any one of the preceding embodiments, wherein updating the candidate communication to reflect the given instance comprises removing one or more components from the candidate communication based on the given instance.

6. The method of any one of the preceding embodiments, wherein updating the candidate communication to reflect the given instance comprises replacing the candidate communication with the given instance.

7. The method of any one of the preceding embodiments, wherein the negative action comprises dismissing the candidate communication.

8. The method of any one of the preceding embodiments, wherein the one or more first machine learning models are trained to dismiss malicious or undesired communications.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for generating a communication modification to reduce inaccurate machine-learning-based communication suppressions, the communication modification being based on a model trained on outputs of one or more user models configured to suppress malicious or undesired communications, the system comprising:

one or more processors; and a non-transitory, computer-readable medium comprising instructions that when executed by the one or more processors cause operations comprising:

obtaining a plurality of suppression-related output labels output by a user machine learning model, the plurality of suppression-related output labels associated with a plurality of training communications and indicating whether a respective training communication provided to the user machine learning model will be suppressed by the user machine learning model, the user machine learning model being trained to facilitate suppression of malicious or undesired communications;

training, using the plurality of training communications and the plurality of suppression-related output labels, a communication processing machine learning model to generate outputs that indicate whether a given candidate communication will be suppressed by the user machine learning model;

in response to detecting a candidate communication, inputting, into the communication processing machine learning model, the candidate communication to obtain a prediction associated with the candidate communication that indicates whether the candidate communication will be suppressed by the user machine learning model; and in response to the prediction associated with the candidate communication indicating that the candidate communication will be suppressed, modifying the candidate communication by (i) generating a plurality of different instances of the candidate communication, (ii) inputting the plurality of different instances into the communication processing machine learning model to generate predictions associated with the plurality of different instances, and (iii) updating the candidate communication to reflect a given instance associated with a prediction indicating that the candidate communication will not be suppressed by the user machine learning model.

2. The system of claim 1, wherein the instructions for updating the candidate communication to reflect the given instance associated with the prediction further cause the one or more processors to perform an operation comprising incorporating one or more terms in the given instance into the candidate communication.

3. The system of claim 1, wherein the instructions for updating the candidate communication to reflect the given instance associated with the prediction further cause the one or more processors to perform an operation comprising removing one or more terms from the candidate communication based on the given instance.

4. The system of claim 1, wherein the instructions for updating the candidate communication to reflect the given instance associated with the prediction further cause the one or more processors to perform an operation comprising incorporating metadata associated with the given instance into the candidate communication.

5. A method comprising:

obtaining a plurality of outputs of one or more first machine learning models associated with one or more users, the plurality of outputs being associated with a plurality of training communications provided to the one or more first machine learning models, each output of the plurality of outputs indicating a prediction of at least one of the one or more first machine learning models with respect to an action to be taken on a respective training communication;

training, using the plurality of training communications and the plurality of outputs, a second machine learning model to generate outputs that indicate whether a negative action will be taken on each candidate communication by the one or more first machine learning models; and subsequent to the training of the second machine learning model, detecting a candidate communication and generating, via the second machine learning model, based on the candidate communication, a prediction associated with the candidate communication, the prediction indicating whether the negative action will be taken on the candidate communication in connection with one or more outputs of the one or more first machine learning models for the candidate communication.

6. The method of claim 5, further comprising in response to the prediction associated with the candidate communication indicating that the negative action will be taken on the candidate communication, modifying the candidate communication by (i) generating a plurality of different instances of the candidate communication, (ii) inputting the plurality of different instances into the second machine learning model to generate predictions associated with the plurality of different instances, and (iii) generating a recommendation comprising a given instance associated with a prediction indicating that the candidate communication will be retained by the one or more first machine learning models.

7. The method of claim 5, further comprising in response to the prediction associated with the candidate communication indicating that the negative action will be taken on the candidate communication, modifying the candidate communication by (i) generating a plurality of different instances of the candidate communication, (ii) inputting the plurality of different instances into the second machine learning model to generate predictions associated with the plurality of different instances, and (iii) updating the candidate communication to reflect a given instance associated with a prediction indicating that the candidate communication will be retained by the one or more first machine learning models.

8. The method of claim 7, wherein updating the candidate communication to reflect the given instance comprises incorporating one or more components of the given instance into the candidate communication.

9. The method of claim 7, wherein updating the candidate communication to reflect the given instance comprises removing one or more components from the candidate communication based on the given instance.

10. The method of claim 7, wherein updating the candidate communication to reflect the given instance comprises replacing the candidate communication with the given instance.

11. The method of claim 5, wherein the negative action comprises dismissing the candidate communication.

12. The method of claim 5, wherein the one or more first machine learning models are trained to dismiss malicious or undesired communications.

13. One or more non-transitory, computer-readable media, comprising instructions that, when executed by one or more processors, cause operations comprising:

receiving a candidate communication;

generating, via a second machine learning model and based on the candidate communication, a prediction indicating that one or more first machine learning models will cause a negative action to be taken on the candidate communication, wherein the second machine learning model is trained based on (i) a plurality of training communications provided to the one or more first machine learning models and (ii) a plurality of outputs of the one or more first machine learning models, the plurality of outputs being associated with the plurality of training communications provided to the one or more first machine learning models; and generating a modification for the candidate communication based on the prediction indicating that the one or more first machine learning models will cause the negative action will be taken on the candidate communication.

14. The one or more non-transitory, computer-readable media of claim 13, wherein generating the modification for the candidate communication comprises (i) generating a plurality of different instances of the candidate communication, (ii) inputting the plurality of different instances into the second machine learning model to generate predictions associated with the plurality of different instances, and (iii) generating a recommended modification comprising a given instance associated with a prediction indicating that the candidate communication will be retained by the one or more first machine learning models.

15. The one or more non-transitory, computer-readable media of claim 13, wherein generating the modification for the candidate communication comprises (i) generating a plurality of different instances of the candidate communication, (ii) inputting the plurality of different instances into the second machine learning model to generate predictions associated with the plurality of different instances, and (iii) updating the candidate communication to reflect a given instance associated with a prediction indicating that the candidate communication will be retained by the one or more first machine learning models.

16. The one or more non-transitory, computer-readable media of claim 15, wherein updating the candidate communication to reflect the given instance comprises incorporating one or more components of the given instance into the candidate communication.

17. The one or more non-transitory, computer-readable media of claim 15, wherein updating the candidate communication to reflect the given instance comprises removing one or more components from the candidate communication based on the given instance.

18. The one or more non-transitory, computer-readable media of claim 15, wherein updating the candidate communication to reflect the given instance comprises replacing the candidate communication with the given instance.

19. The one or more non-transitory, computer-readable media of claim 13, wherein the negative action comprises dismissing the candidate communication.

20. The one or more non-transitory, computer-readable media of claim 13, wherein the one or more first machine learning models are trained to dismiss malicious or undesired communications.

* * * * *